United States Patent [19]

Titone et al.

[11] 4,234,007
[45] Nov. 18, 1980

[54] AUTOMATIC LIQUID FLOW CONTROL DEVICE

[75] Inventors: Joseph R. Titone; David C. Brissey; Denny L. Carlson, all of Iowa City, Iowa

[73] Assignee: Scientific Applications Incorporated, Mount Pleasant, Iowa

[21] Appl. No.: 933,625

[22] Filed: Aug. 14, 1978

[51] Int. Cl.³ .................. G05D 11/13; F04B 39/00
[52] U.S. Cl. ................... 137/101.19; 137/567; 417/43
[58] Field of Search ............... 137/88, 98, 101.19, 137/101.21, 567; 417/43

[56] References Cited

U.S. PATENT DOCUMENTS

| | | | |
|---|---|---|---|
| 3,250,218 | 5/1966 | Sinclair | 137/88 |
| 3,385,680 | 5/1968 | Feld et al. | 137/88 X |
| 3,751,644 | 8/1973 | Mayer | 137/88 X |

*Primary Examiner*—William R. Cline
*Attorney, Agent, or Firm*—Zarley, McKee, Thomte, Voorhees & Sease

[57] ABSTRACT

An automatic liquid flow control device for use in the application of building insulation foam is disclosed comprising flow meters to measure the flow of resin and foaming agent through conduits to the application gun, a needle valve connected to the resin conduit and operated by a servo motor, a controller to control the servo motor and having a selector to allow selection of the desired ratio of resin to foaming agent, a comparator to compare the actual ratio of resin flow/foaming agent flow to the selected ratio with the controller automatically controlling the servo motor and needle valve to "slave" the resin flow to the foaming agent flow in order to adjust the resin flow/foaming agent flow to the selected ratio. The comparator also compares the actual flow through the resin and foaming agent conduits to predetermine flow values in order to determine abnormal operating conditions. Visual indicators provide visual indication of these abnormal operating conditions and provide visual indication of deviation from the selected ratio. The controller deactivates the servo motor in response to these abnormal operating conditions or to excessive deviation from the selected ratio. The driving pump for the resin and foaming agent liquids is electrically connectable to the controller so that the controller can also deactivate the pump due to the presence of abnormal operating conditions or excessive deviation of ratio mixture for a predetermined time interval.

5 Claims, 3 Drawing Figures

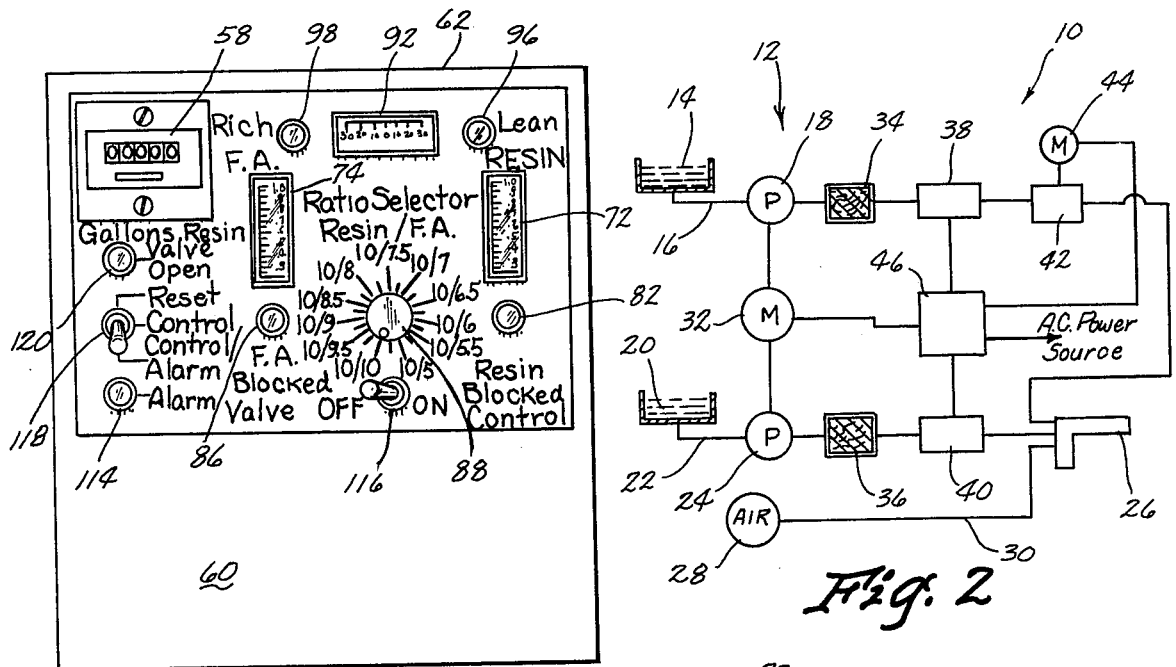
Fig. 1
Fig. 2
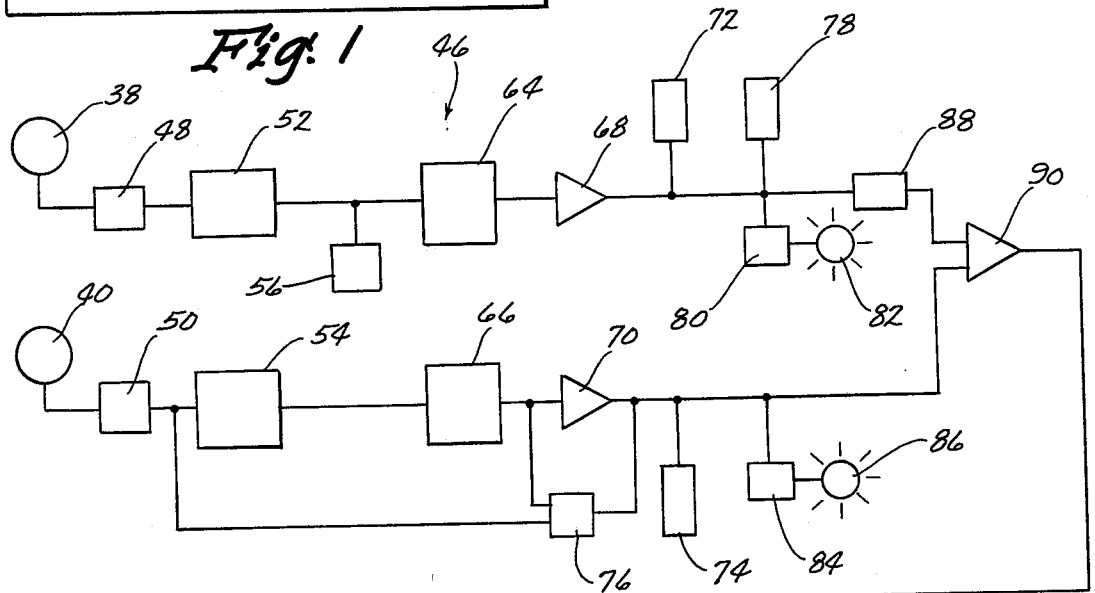
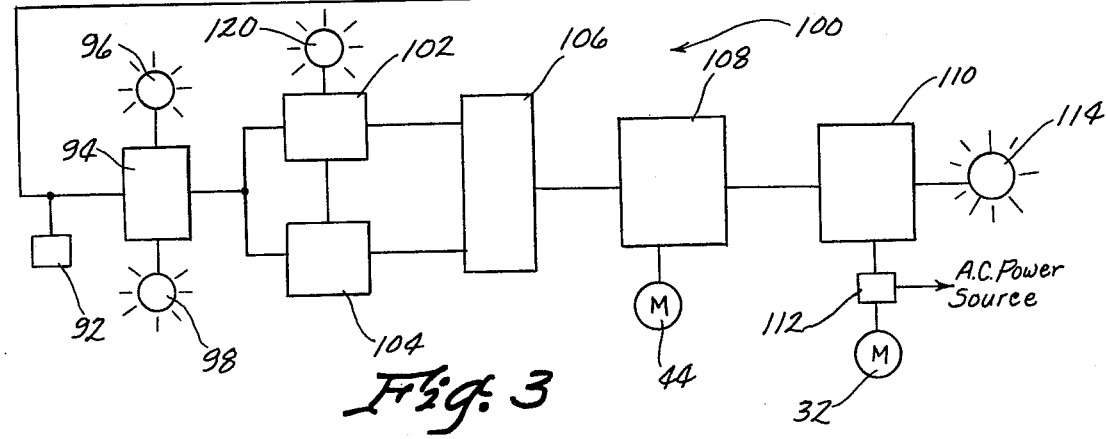
Fig. 3

AUTOMATIC LIQUID FLOW CONTROL DEVICE

BACKGROUND OF THE INVENTION

This invention relates to an automatic liquid flow control device and more particularly to an automatic liquid flow control device for use in the application of building insulation foam comprised of resin and foaming agent. In applying insulating foam, air is mixed with the foaming agent at the applicator gun and then resin is applied to the mixture just prior to application. The proper ratio of resin to foaming agent is important. Too low a ratio produces a foam that is unsatisfactory for insulation and too high a ratio is inefficient, costly and environmentally injurious. Theoretically, a particular mixture of resin and foaming agent produces an optimum R value. The physical nature of the application systems and the materials involved do not allow an initial set mixture ratio to be maintained throughout the application as clogging and pumping variations will deviate the ratio beyond desired limits. To maintain the mixture ratio even within broad acceptable ranges, the mixture should be analyzed and the flow rate adjusted a number of times during application. Since this is laborious and time consuming, applicators tend to pour the resin too richly, thereby operating inefficiently, or they pour an inferior grade of insulating foam.

Prior to this device, applicant knows of no device available to provide selection of the mixture ratio of resin/foaming agent, the constant measurement and comparison of flow rates, and the constant adjustment of the flow rate of resin to maintain the ratio within acceptable efficient limits.

SUMMARY OF THE INVENTION

An automatic liquid flow control device for use in the application of building insulation foam is disclosed comprising flow meters to measure the flow of resin and foaming agent through conduits to the application gun, a needle valve in the resin conduit operated by a servo motor to control the flow rate in the resin conduit, a controller to control the servo motor and thus the flow rate of resin with the controller having a selector to allow selection of the desired ratio of resin to foaming agent, a comparator to compare the actual ratio of resin flow/foaming agent flow to the selected ratio with the controller automatically activating the servo motor to maintain the ratio within predetermined limits. The comparator also compares the actual flow of resin and flow of foaming agent to a predetermined flow value to determine abnormal operating conditions such as clogging and pump failure. Visual indicators provide indication of these abnormal operating conditions and deviation of the actual ratio from the selected ratio of resin/foaming agent mixture. Visual meters provide direct reading of the flow rate and the percentage deviation of the actual mixture. The controller also deactivates the servo motor in response to abnormal operating conditions or in the event of excessive deviation from the selected mixture ratio. The controller will also operate the servo motor at a higher speed to rapidly correct excessive conditions. The driving pump for the resin and foaming agent is electrically connectable to the controller so that the presence of abnormal operating conditions or excessive deviation of the ratio mixture will cause the controller to deactivate the pump after a predetermined time interval.

It is a principal object of this invention to provide an automatic liquid flow control device for use in the application of building insulation foam.

A further object of the invention is to provide an automatic liquid flow control device that continually measures the flow of liquid through one conduit and the flow of liquid through another conduit and automatically adjusts the flow of liquid in one conduit to maintain a preselected flow ratio.

A still further object of the invention is to provide an automatic liquid flow control device that provides visual indication of the actual flow rate in each conduit.

A still further object of the invention is to provide an automatic liquid flow control device that visually displays the percentage deviation from the selected mixture ratio.

A still further object of the invention is to provide an automatic liquid flow control device that is adaptable to conventional building insulating foam applicators.

A still further object of the invention is to provide an automatic flow control device that is connectable to conventional building insulation foam applicators to deactivate the applicators upon deviation from a preselected mixture ratio or upon the decrease in flow rate below a predetermined amount.

A still further object of the invention is to provide an automatic liquid flow control device that is economical to manufacture, durable in use, efficient in operation, and refined in appearance.

BRIEF DESCRIPTION OF THE DRAWINGS

FIG. 1 is a frontal view of the control housing panel.

FIG. 2 is a schematic block diagram of an insulation foam application system connected to the invention.

FIG. 3 is an electrical schematic block diagram of the present invention.

DESCRIPTION OF THE PREFERRED EMBODIMENT

The automatic liquid flow control device, generally designated by the numeral 10, is shown in FIG. 2 connected to a conventionally arranged applicator system 12 for applying urea-formaldehyde insulation foam to a building.

A conventionally arranged applicator system 12 comprises a resin reservoir 14, a resin conduit 16, a resin pump 18, a foaming agent (hereinafter abbreviated as FA) reservoir 20, FA conduit 22, a FA pump 24, an applicator gun or nozzle 26, an air supply 28, an air conduit 30 and a motor 32 to drive pumps 18 and 24. The operation of a conventional arrangement involves mixing the foaming agent with air at the nozzle to form bubbles of foaming agent and then covering the bubbles with a layer of resin as the material is applied within the walls of a building for insulation.

The liquid flow control device 10 is shown connected to applicator system 12 in FIG. 2 and comprises filters 34 and 36, flow meters 38 and 40, needle valve 42, servo motor 44, and controller 46.

Flow meters 38 and 40 are turbine flow meters that produce an electrical signal proportional to the rate of flow of liquids therethrough. Operational amplifiers 48 and 50 process the electrical signals from flow meters 38 and 40, respectively, for use by controller 46. Many of the elements contained in the resin line portion of the device have direct counterparts in the FA portion so that these elements may be described singularly. One shot circuits 52 and 54 extend the pulses received from the flow meters via the operational amplifiers in a conventional fashion. Totalizer 56 is electrically connected to one shot 52 and provides a count of liquid volume units of resin flowing through conduit 16. A visual total is shown on indicator face 58 of the front panel 60 (FIG. 1) of housing structure 62 which contains the electrical components of the controller 46.

Integrators 64 and 66 together with amplifiers 68 and 70, respectively, process and amplify the signals to drive indication flow meters 72 and 74. Flow meter 72 provides a visual indication on the front panel 60 of the flow rate of resin through conduit 16 in gallons per minute. Likewise, flow meter 74 provides a visual indication of the flow of foaming agent through conduit 22. In order that flow meters 72 and 74 be of similar design and allow direct comparison of the two flow rates, compensation must be electrically introduced to compensate for the fact that the resin exhibits flow characteristics different from the foaming agent. The resin is thicker and does not begin to flow as easily or quickly as the foaming agent and requires additional time to reach an ordinary flow rate. It has been determined that a 0.4 gallon per minute correction factor adequately compensates for the initial lag in flow of the resin necessary to produce the pulses from the flow meter 38 and operational amplifier 48. Therefore, reducer 76 electrically connected to amplifier 70 and one shot 54 electrically reduces the signal in the foaming agent branch of the circuit to allow direct comparison of flow rates and utilization of similar indicator meters 72 and 74. Reducer 76 also contains a detector type circuit such that in the absence of a signal, thereby indicating no flow of foaming agent, the reducer 76 is deactivated to prevent pegging of the indicator meter 74 in the negative direction.

Comparator 78 compares the actual flow rate of resin to a predetermined value and electrically determines that the application gun is in an operating condition by the detection of a flow rate of 0.2 gallons per minute or greater. The controller 46 will remain inactive for a flow rate less than 0.2 gallons per minute. Because the conduits 16 and 22 are generally plastic hose of long length and are exposed to pressures of 100 to 150 p.s.i., the hose acts like an accumulator and therefore requires a certain time period to reach a steady state of flow. To prevent unnecessary wear on the needle valve 42 by attempting to compensate during this transitory state, a five second delay after the gun is in an operating condition is experienced before the controller 46 will activate motor 44.

Comparator 80 determines electrically if the resin flow rate is greater than 0.5 gallons per minute. A flow rate of less than 0.5 gallons per minute indicates an operational abnormality such as a blocked resin line or a malfunctioning pump. Indicator light 82 is electrically connected to comparator 80 and displayed on front panel 60 and visually indicates a resin flow rate of below 0.5 gallons per minute for a "resin blocked" abnormal operating condition. This indicator light visually alerts the operator that such a condition exists in the resin flow portion of the device. In a similar manner, comparator 84 and indicator light 86 visually display such an abnormal operating condition in the foaming agent portion of the device.

Ratio selector 88 allows selection of the ratio of resin flow/foaming agent flow between the limits of 1:1 up to 10:5, which are the preferable ratios for insulating purposes. Comparator 80 and 84 are electically connected to amplifier 90 with ratio selector 88 interconnected between comparator 80 and amplifier 90. Indicator meter 92 is electrically connected to amplifier 90 and provides visual indication on the front panel 60 of a comparison between the actual ratio (of resin flow to foaming agent flow) to the selected ratio (of resin flow to foaming agent flow). The "off ratio" reading of meter 92 is expressed in terms of percentage and indicates whether the actual ratio is off a certain percentage resin lean or a certain percentage resin rich. Comparator 94 activates indicator light 96 when the actual flow ratio deviates from the selected flow ratio by greater than 15% resin lean. In a similar manner, comparator 94 will activate indicator light 98 when the deviation is more than 15% resin rich as compared to the selected ratio.

Servo motor 44 is controlled by a control circuit generally designated as 100 to progressively open or close needle valve 42 thereby regulating the flow of resin to bring the actual mixture ratio to substantially approximate the selected mixture ratio. Servo motor control circuit 100 is comprised of valve "open" control and timing circuit 102, valve "close" control and timing circuit 104, motor speed control 106, and direction control 108, as shown in FIG. 3. A condition of more than 2% "off ratio lean" will activate control circuit 100 to open valve 42. A condition of 15% or more "off ratio lean" will activate motor 44 at a greater speed in order to more rapidly adjust the actual flow ratio to the selected flow ratio. A similar response is exhibited for the opposite condition of resin rich with valve 42 being closed rather than opened. This two speed operation of the servo motor 44 allows for quick response to more excessive conditions, yet prevents overshoot and allows a finer adjustment as the actual ratio approaches the selected ratio.

Alarm and timing circuit 110 is electrically connected to control circuit 100 and provides shut off operations of the servo motor 44 and the pump motor 32 in the event that certain abnormal operating conditions exist. Pump 32 is deactivated by power relay 112 cutting off the AC power to pump 32 while motor 44 is deactivated via control circuit 100. Should the flow rate of either resin or foaming agent remain below 0.5 gallons per minute for a period of time greater than 5 seconds, the pump motor will be deactivated and the alarm indicator light 114 on the front panel 60 will be activated. The servo motor 44 is deactivated immediately when the flow of resin or foaming agent drops below 0.5 gallons per minute and the respective indicator light 82 or 86 is on. If the 15% off ratio limits are exceeded, resulting in servo motor 44 operating at the higher speed to correct the condition, the presence of the condition for approximately 12 seconds will cause alarm circuit 110 to deactivate pump motor 32 and thereby deactivate servo motor 44 with alarm indicator light 114 again being activated. These time delayed deactivation functions provide ample time for the device to correctly readjust the flow rates yet also prevent the operator from ignoring excessive conditions and pouring an incorrect mixed foam into a building for extended periods.

Additional operating features are displayed on front panel 60 in FIG. 1. Switch 116 allows servo motor 44 and thus needle valve 42 to be deactivated. Switch 118 provides three basic settings. The "reset" position activates servo motor 44 to open valve 42 at the higher speed until valve 42 is fully open, thereby activating indicator light 120. With the exception of indicator light 120, switch 118 in the reset position will deactivate the remaining lights and reset power relay 112 to allow the pumping units to begin again.

By placing switch 116 in the "valve off" position and placing switch 118 in the "control" position, valve 42 is deactivated and the operator can determine the actual mixture ratio by turning ratio selector 88 until meter 99 displays a "null" condition. The ratio indicated by selector 88 is therefore the actual mixture ratio. In either this condition or in the "reset" position, flow control device 10 is essentially monitoring the pumping operation so that the flow rates can be monitored and observed but since the motorized valve is off, the unit is passive and cannot make any adjustments.

The "control/alarm" position of switch 118 is the normal operating position for control device 10 to monitor and maintain the proper selected mixture ratio. In this position, the flow rate of resin is "slaved" to the flow rate of foaming agent to provide the desired proportion or ratio. Thus, the desired ratio is automatically maintained with visual indication thereof and any abnormal operating conditions such as a blocked resin orifice in the applicator gun, low pump pressure, a blocked bead chamber in the gun, or a closed control valve will be detected and indicated by the appropriate indicator lights on the front panel to alert the operator. Abnormal operating conditions cannot be ignored by the operator for any substantial period of time that may adversely affect the insulation application.

Thus, it can be seen that this device accomplishes at least all of its stated objectives.

What is claimed is:

1. An automatic liquid flow control device, comprising, first metering means for measuring the rate of flow of liquid through a first conduit means, second metering means for measuring the rate of flow of liquid through a second conduit means, valve means connected to said second conduit means to control the rate of flow of liquid through said second conduit means, and selectable valve control means operationally connected to said valve means and said first metering means to automatically maintain the rate of flow of liquid through said second conduit means to substantially maintain a preselected ratio of flow rate through said second conduit means to flow rate through said first conduit means, said valve control means comprising a motor means connected to said valve means to progressively alternately open and close said valve means to selectively progressively increase or decrease the flow rate through said second conduit means, a selector means to allow selection of a desired ratio to flow rate in said second conduit means to the flow rate in said first conduit means, a first comparator means electrically connected to said first and second metering means and said selector means to compare the actual ratio of flow rate in said first and second conduit means to the selected ratio of said selector means, and a motor control means to activate said motor means so that said valve means adjusts the flow rate in said second conduit means whereby said actual ratio of flow rate substantially approaches said selected ratio of flow rate of said selector means, said motor control means being electrically connected to said motor means and said comparator means, said motor control means comprising a direction control means to control the direction of rotation of said motor means whereby rotation in one direction progressively opens said valve means and rotation in the other direction progressively closes said valve means, and speed control means to increase the speed of said motor means when said actual ratio of flow rate deviates from said selected ratio by a first predetermined percentage, said direction control means and said speed control means being electrically interconnected and electrically connected to said motor means and said comparator means.

2. The device of claim 1 wherein second comparator means is electrically connected to said first comparator means, said second comparator means adapted to compare the flow rate through said first conduit means to a first predetermined flow rate and to a second predetermined flow rate and to compare the flow rate through said second conduit means to said first predetermined flow rate and to said second predetermined flow rate, and second visual indication means electrically connected to said first and second comparator means to independently visually indicate: that the flow rate through said first conduit means is less than said second predetermined flow flow rate; that the flow rate through said second conduit means is less than said second predetermined flow rate; that said actual ratio exceeds said selected ratio by a first predetermined percentage; and that said selected ratio exceeds said actual ratio by said first predetermined percentage.

3. The device of claim 2 wherein said motor control means comprises, first timer means electrically connected to said motor means to delay operation of said motor means a first predetermined time period subsequent to an actual fluid flow rate through said first and second conduit means above said first predetermined flow rate; and first cut off means to deactivate said motor means when the flow rate through said first conduit means or said second conduit means is less than said second predetermined flow rate, said cut off means being electrically connected to said motor means.

4. The device of claim 4 wherein a pump means pumps the liquid through said first and second conduit means, second cut off means to deactivate said pump means is electrically connected to said pump means and said first and second comparator means, and second timer means is electrically connected to said cut off means so that said cut off means deactivates said pump means: a second predetermined time period subsequent to said second predetermined flow rate continually exceeding the flow rate through said first conduit means; a second predetermined time period subsequent to said second predetermined flow rate continually exceeding the flow rate through said first conduit means; a third predetermined time period subsequent to said actual ratio continually exceeding said selected ratio by said first predetermined percentage; a third predetermined time period subsequent to said selected ratio continually exceeding said actual ratio by said first predetermined percentage.

5. The device of claim 1 wherein
a first visual indication means is electrically connected to said first metering means to provide visual indication of the flow rate through said first conduit means, said first visual indication means having a first flow rate scale,
a second visual indication means is electrically connected to said second metering means to provide visual indication of the flow rate through said second conduit means, said second visual indication means having a second flow rate scale, and
scale factor means to electrically compensate for the flow characteristics of the liquid in said second conduit means so that said first flow rate scale is the same as said second flow rate scale to allow direct comparison between the flow rate in said first and second conduit means, said scale factor means being electrically connected to said first visual indication means and said first metering means.

* * * * *